Oct. 20, 1931.   F. W. MacMARTIN   1,828,504
CARRIER FOR DISPATCH SYSTEMS
Filed Feb. 24, 1930
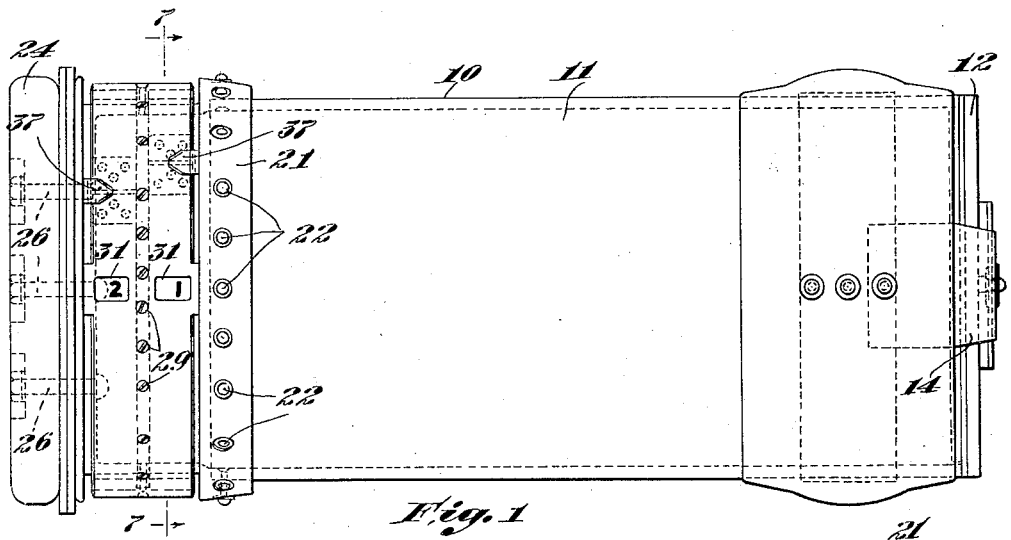
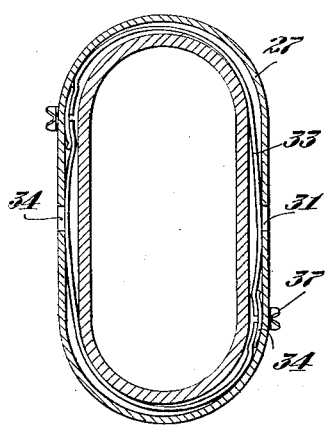
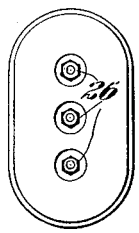
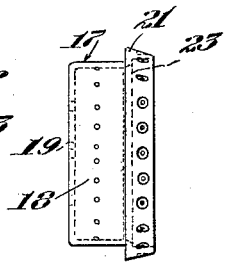
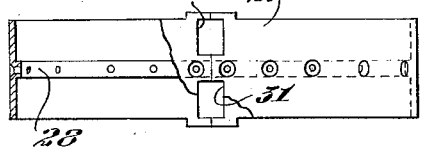
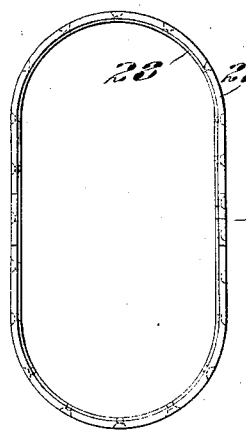
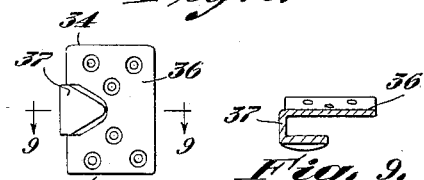
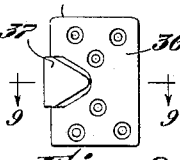
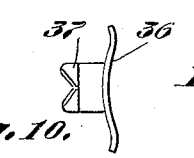
Inventor
Frank W. MacMartin.
by Roberts Cushman Woodbury
Attys.

Patented Oct. 20, 1931

1,828,504

UNITED STATES PATENT OFFICE

FRANK W. MacMARTIN, OF SYRACUSE, NEW YORK, ASSIGNOR TO THE LAMSON COMPANY, OF SYRACUSE, NEW YORK, A CORPORATION OF MASSACHUSETTS

CARRIER FOR DISPATCH SYSTEMS

Application filed February 24, 1930. Serial No. 430,496.

This invention relates to carriers for handling documental papers such as are used in insurance companies and banks, as well as to carriers in general such as are used for other papers, files, money, machine parts, etc. which are to be transported through conveyor systems from one station to another. When used in conveyor systems of the type disclosed in my copending application, Serial No. 422,313, filed January 21, 1930, these carriers may pass while en route to their destination, through a relay station or stations at which they are sorted by operators and placed in the proper conveyor or dispatch tube. It is advantageous to be able to dispatch such carriers from one station to another without opening a carrier to ascertain its destination, but this requires that means be provided for indicating to relay operators the destination or the particular route to be taken by a carrier. Furthermore, as the carriers may take different routes on different occasions and hence come to different relay or sub-stations, it is desirable that each carrier be provided with means for indicating any one of a large number (preferably the total number) of stations and destinations comprised in the system.

Objects of the present invention are to provide carriers of this general class with means for indicating any one of a plurality of redispatch stations, and also for indicating any one of a plurality of final destinations; to provide carriers with indicating means which may be observed readily by an operator; to provide an endless indicia carrying band capable of use with carriers of non-circular cross section; to provide indicating means which when applied to a carrier of flattened or oval shape will be visible from either side of the carrier; and also to provide indicating means for these purposes of relatively simple, efficient and yet rugged and durable construction.

Indicating means capable of performing these functions may comprise a plurality of relatively movable indicators each bearing numerals, letters or other indicia and preferably arranged to expose simultaneously certain characters of each indicator. In this way a relatively large number of permutations or combinations of the characters on the different indicators may be effected from which operators may be informed of the route to be taken. Handling of these carriers may be further expedited by arranging the characters on one indicator at least in different color fields so that an operator may know the intended route at a glance without pausing to read the symbols exposed.

In the drawings:

Fig. 1 is a side elevation of a carrier of flattened or oval form;

Figs. 2 and 3 are elevational views showing opposite ends respectively of the carrier disclosed in Fig. 1;

Fig. 4 is a side elevation of a member forming part of the end construction of the carrier shown in Fig. 1;

Fig. 5 is a side elevation partly in section of a shield member;

Fig. 6 is a plan view of the member shown in Fig. 5;

Fig. 7 is a section taken substantially along the line 7—7 of Fig. 1;

Fig. 8 is a top plan view of a connecting member;

Fig. 9 is a section taken substantially along the line 9—9 of Fig. 8;

Fig. 10 is an end elevation of the member shown in Fig. 8;

Figs. 11 and 12 are top plan views of flexible bands.

One preferred embodiment of the invention is illustrated in the drawings as applied to a carrier 10 having a flattened or oval shaped body comprising a shell 11 and a permanent closure member 17 at one end of the shell. The carrier also has a cover 12 at the other end of the shell and connected to the shell by the hinge 13. A flexible strap 14 attached to the opposite side of the shell carries one of the cooperating parts of the snap fastener 16 by which the cover may be secured in closed position.

In accordance with the present invention, the permanent closure member 17 is of a rigid cup-like form (Fig. 4) preferably being made of a suitable metal such as aluminum and comprises side walls 18 (similar in contour to that of the carrier shell) connected integrally to an end wall 19 which permanently closes this end of the carrier. An outwardly offset attaching flange 21 is integrally connected to the side walls and adapted to be attached, as by means of rivets 22, (Fig. 1) to the exterior of the carrier. Within this flange an interior shoulder 23 is disposed to abut against the end of the shell 11 for assisting in rigidly connecting these parts. A buffer or head 24 of felt or the like is connected to the end wall 19 of this closure member by means of bolts 26, the heads of which are countersunk or set in recesses in the outer end wall of the buffer. The exterior surface of the side wall 18 of closure member 17 constitutes a raceway or guiding surface for indicators consisting of endless flexible bands carrying indicia.

The shield 27 shown in Figs. 5 and 6 comprises an endless band having intermediate the longitudinal edges thereof, an inner circumferentially extending rib 28 which is adapted to fit upon the exterior surface of the side wall 18 of the closure member 17, and it is preferably affixed thereto by means of machine screws 29 which may be countersunk so as to be flush with the exterior surface of the shield as shown. When assembled in this manner the inner circumferential rib 28, together with the longitudinally extending portions of the band 27 and the exterior surface of the closure member define parallel circumferentially extending guideways.

The shield 27 shown in Figs. 1, 5 and 6 is provided with longitudinally aligned openings or windows 31 which are arranged in circumferentially spaced pairs, preferably at diametrically opposite sides of the carrier for simultaneously exposing indicia on both sides of the carrier.

The flexible indicators or index carriers 32, 33 shown in Figs. 11 and 12 are located in the guideways formed on the underside of the shield 27 at opposite sides of rib 28. In order that these indicators may function to expose the same symbol or number through the windows 31 on opposite sides of the carrier, each indicator is adapted to extend approximately half way around the carrier and is connected to another indicator of similar construction to form an endless index-carrying band as will be apparent from Fig. 7. For connecting the indicators, connecting members 34 such as shown in Figs. 8, 9 and 10 may be employed. The member 34 comprises an arcuate portion 36 having approximately the same width as the indicators to be connected, and from this arcuate portion an actuating arm 37 extends outwardly and is bent longitudinally to overhang the arcuate portion. The longitudinally extending portion of this arm may also be bent transversely somewhat in a V-shape to facilitate moving the band. In assembling the endless band two of the indicators 32 or 33 are connected as by means of rivets to the arcuate portions 36 of two of the connecting members 34 as will be apparent from Figs. 7 to 10. The indicators are preferably of ribbon-like shape and flexible material (for example celluloid) having inherent resiliency sufficient to tend to hold the indicators approximately flat so that when assembled around the casting in the guideways, they will tend to flex outwardly and thus bring their surfaces adjacent to the windows 31 provided for exposing indicia.

The indicia may comprise any approved series of characters, preferably numerals which may run successively from 0 to 13 and also include additional designations such as "File" and "Mail" as shown in Fig. 11. The indicator 33 in Fig. 12 may, if desired, be provided only with numerals from one to zero as shown. For expediting handling carriers equipped with such indicating devices the numerals shown on one of the indicators, preferably those on the indicator 32 in Fig. 11, are disposed in fields of different color as indicated by way of example in this figure. This enables an operator at a relay or other station along the route which the carrier is to follow, to know the destination at a glance from the color exposed by this field without pausing to read the symbol. As will be seen from Figs. 1 and 7, the overhanging arm 37 of each connecting member overlies the endless closure member or shield 27 and the outwardly extending portion of this arm is adapted to cooperate with the longitudinal edges of this shield for assisting in guiding the flexible bands about the carrier, and provides a handle or actuator by means of which the band may be moved to expose the desired indicia. The inherent resiliency of these indicators, which may be of celluloid or other suitable material, and also the manner of connecting the arcuate member tends to flex the indicator to bring the indicia thereon closer to the exposure windows.

I claim:

1. A carrier of the class described comprising a body, a flexible endless index-carrying band embracing the body and movable relatively thereto and a shield fixed upon said body and surrounding said band.

2. A carrier of the class described comprising a body of non-circular transverse section, a movable index carrier engaging the peripheral surface of the body and a shield fixed upon said body and surrounding said carrier.

3. A carrier of the class described comprising a body, an index-carrying band embracing the body, said band including a flexible ribbon-like member, and means for connecting the opposite ends of said flexible member and a shield fixed upon said body and surrounding said band.

4. A carrier of the class described comprising a body, an index-carrying band embracing the body and movable relatively thereto, said band including a plurality of aligned flexible members each provided with index characteristics, and means connecting adjacent ends of said members and a shield fixed upon said body and surrounding said band.

5. A carrier of the class described comprising a body, an endless band embracing said body, the band being movable around the carrier body, said band carrying two like sets of index characteristics so arranged that like characteristics of the two sets are always disposed at diametrically opposite points of the carrier body and a shield fixed upon said body surrounding said band and having diametrically opposite windows therein, through which said like characteristics are exposed.

6. A carrier of the class described having a body of non-circular section, movable index means arranged at opposite sides of the body, means for enclosing said index means and having windows at opposite sides of the body and means for simultaneously adjusting the index means at opposite sides of the carrier relative to the windows in said enclosing means.

7. The combination with a carrier of the class described, of a plurality of movable indicia carriers, means for enclosing indicia of the indicia carriers, and means for simultaneously moving said carriers and exposing indicia of each carrier.

8. The combination with a carrier of the class described, of a plurality of movable indicia-bearing members, means for enclosing the indicia-bearing members, said means including windows for exposing indicia of said indicia-bearing members, and means for shifting said indicia-bearing members relatively to said enclosing means for exposing different indicia.

9. The combination with a carrier of the class described, of a plurality of movable indicia-bearing members, means for enclosing the indicia-bearing members, said means including windows for exposing indicia of said indicia-bearing members, and means for shifting said indicia-bearing members relatively to said enclosing means for exposing different indicia at the windows, the characters comprising indicia of at least one of the indicia-bearing members being disposed in fields of different colors.

10. The combination with a carrier of the class described, of a plurality of indicia-bearing members, means for enclosing the indicia-bearing members, said means including windows disposed side by side for simultaneously exposing indicia of said indicia-bearing members, said indicia-bearing members being relatively movable for exposing different indicia.

11. The combination with a carrier of the class described, of a plurality of movable indicia-bearing members, means for enclosing the indicia-bearing members, said means including windows for exposing indicia of said indicia-bearing members, and means for shifting said indicia-bearing members relatively to said enclosing means for exposing different indicia, the characters comprising indicia of said indicia-bearing members being so arranged and disposed that when exposed through said windows they may be read simultaneously from the same position at all times.

12. The combination with a carrier of the class described, of a plurality of members bearing indicia, means for enclosing the members, said means including windows for exposing indicia on the members, the indicia-bearing members being movable in a plurality of directions past the windows to facilitate exposing combined symbols comprising indicia from said members.

13. The combination with a carrier of the class described, of movable indicia-bearing members at different sides of the carrier, means for enclosing the indicia-bearing members, and means for exposing like indicia at different sides of the carrier.

14. The combination with a carrier of the class described, of a plurality of members bearing indicia and movable at different sides of the carrier, and means for enclosing the members bearing indicia, said enclosing means having windows disposed at different sides of the carrier for simultaneously exposing indicia at said different sides.

15. The combination with a carrier of the class described, of a plurality of endless bands independently movable about the periphery of the carrier, means for enclosing the bands, said enclosing means having windows arranged in pairs on different sides of the carrier, the indicia of each band comprising two series of characters arranged in the same order and spaced to expose the same characters through the windows on the different sides of the carrier.

16. The combination with a carrier of the class described, of flexible, indicia bearing bands movable in substantially parallel paths about the carrier, and means encompassing the bands and having openings arranged in circumferentially spaced pairs for simultaneously exposing indicia on different sides of the carrier.

17. The combination with a carrier of the class described, of inner and outer members mounted upon the carrier and spaced to define guideways, and flexible indicia bearing bands operable independently in the respective guideways, said outer member having openings therethrough arranged in circumferentially spaced pairs for simultaneously exposing indicia of the bands on different sides of the carrier.

18. The combination with a carrier of the class described, of an endless shield encompassing the carrier and having an inner circumferentially extending rib fitting the carrier, said rib being disposed intermediate the longitudinal edges of the shield, said rib being affixed to the carrier and defining with the carrier and the marginal portions of the shield longitudinally spaced circumferentially extending guideways, and flexible indicia-bearing bands independently movable in the guideways, the endless shield having openings arranged in circumferentially spaced pairs for simultaneously exposing indicia on different sides of the carrier.

19. A carrier of the class described comprising a shell, a closure member for one end thereof, said closure member comprising a side wall having a contour similar to that of the shell and an end wall for closing the end of the shell, said side wall having an outwardly offset flange for attachment to the exterior of the shell, and a shoulder within the flange adapted to abut the end of the shell.

20. A carrier of the class described comprising a shell, a closure member for one end thereof, said closure member comprising a side wall having a contour similar to that of the shell and an end wall for closing the end of the shell, said side wall having an outwardly offset flange for attachment to the exterior of the shell, and a shoulder within the flange adapted to abut the end of the shell and movable indicia bearing members engaging said side wall.

21. A carrier of the class described comprising a shell, a closure member for one end thereof, said closure member comprising a side wall having a contour similar to that of the shell and an end wall for closing the end of the shell, said side wall having an outwardly offset flange for attachment to the exterior of the shell, and a shoulder within the flange adapted to abut the end of the shell and movable indicia bearing members engaging said endless side wall, and a shield affixed to said side wall for enclosing the indicia bearing members, said shield having openings therethrough for exposing selected indicia.

22. The combination with a carrier of the class described, of circumferentially extending inner and outer walls spaced to define circumferentially extending guideways, and flexible indicia bearing bands movable in the guideways, the outer wall having longitudinally aligned openings for simultaneously exposing indicia on the flexible bands.

23. The combination with a carrier of the class described, of circumferentially extending inner and outer walls spaced to define circumferentially extending guideways, and flexible indicia bearing bands movable in the guideways, the outer wall having longitudinally aligned openings for simultaneously exposing indicia on the flexible bands, and means tending to hold the flexible bands in adjusted positions.

24. The combination with a carrier of the class described, of circumferentially extending inner and outer walls spaced to define circumferentially extending guideways, and flexible indicia bearing bands movable in the guideways, the outer wall having longitudinally aligned openings for simultaneously exposing indicia on the flexible bands, and means tending to flex the flexible bands to hold the latter close to the openings so that indicia thereon may be easily read.

25. The combination with a carrier of the class described, of circumferentially extending inner and outer walls spaced to define circumferentially extending guideways, and flexible indicia bearing bands movable in the guideways, the outer wall having longitudinal edges and longitudinally aligned openings for simultaneously exposing indicia on the flexible bands, and means cooperating with the longitudinal edges of the outer wall for assisting in guiding the flexible bands.

26. The combination with a carrier of the class described of a shield fixed upon and surrounding the carrier body and spaced therefrom to provide a circumferentially extending guideway, a flexible indicia carrying band in said guideway and means for moving said band in said guideway, said shield having a window therein at which a selected indicia may be exposed by the moving of said band.

27. The combination with a carrier of the class described having an oval body, of a shield fixed upon and surrounding the body and spaced therefrom to provide a circumferentially extending guideway, and a flexible band in said guideway consisting of two index carrying indicators and connecting means for joining said indicators end to end, said shield having a window in each of the flat sides of the carrier and said connecting means projecting from said shield and either being engageable to shift the band in the guideway and expose a selected indicia on each indicator simultaneously at the windows of the shield.

28. The combination with a carrier of the class described of circumferentially extending inner and outer walls spaced to define a circumferentially extending guideway, and a flexible indicia bearing band consisting of at least two indicators and connecting members by which the ends of the indicators are joined, said outer wall having a longitudinal edge and windows associated with each indicator, and said connecting members projecting beyond the edge of the outer wall and any one being engageable to shift the band in the guideway to expose a selected indicia on each indicator simultaneously at the windows of the outer wall.

29. The combination with a carrier of the class described of circumferentially extending inner and outer walls spaced to define a circumferentially extending guideway, and a flexible indicia bearing band consisting of at least two indicators and connecting members by which the ends of the indicators are joined, said outer wall having a longitudinal edge and windows associated with each indicator, and said connecting members projecting around the edge of the outer wall over the outer surface thereof, and any one being engageable to shift the band in the guideway to expose selected indicia on each indicator simultaneously at the windows of the outer wall.

Signed by me at Syracuse, N. Y., this 18th day of February, 1930.

FRANK W. MacMARTIN.